US012423334B2

(12) United States Patent
Teyer et al.

(10) Patent No.: US 12,423,334 B2
(45) Date of Patent: Sep. 23, 2025

(54) COLLECTING AND SUPPORTING QUERYING OF HIGH-CARDINALITY TIME-SERIES DATA

(71) Applicant: Salesforce, Inc., San Francisco, CA (US)

(72) Inventors: Paymon Teyer, San Ramon, CA (US); Jackson Herrick, San Francisco, CA (US)

(73) Assignee: Salesforce, Inc., San Francisco, CA (US)

( * ) Notice: Subject to any disclaimer, the term of this patent is extended or adjusted under 35 U.S.C. 154(b) by 265 days.

(21) Appl. No.: 18/348,887

(22) Filed: Jul. 7, 2023

(65) Prior Publication Data

US 2024/0411784 A1    Dec. 12, 2024

Related U.S. Application Data

(60) Provisional application No. 63/507,098, filed on Jun. 8, 2023.

(51) Int. Cl.
| G06F 16/28 | (2019.01) |
| G06F 11/34 | (2006.01) |
| G06F 16/2458 | (2019.01) |

(52) U.S. Cl.
CPC ........ G06F 16/287 (2019.01); G06F 11/3419 (2013.01); G06F 16/2474 (2019.01); G06F 16/283 (2019.01)

(58) Field of Classification Search
None
See application file for complete search history.

(56) References Cited

U.S. PATENT DOCUMENTS

| 10,489,170 | B2 | 11/2019 | Toal et al. |
| 10,810,230 | B2 | 10/2020 | Toal et al. |
| 11,082,519 | B2 | 8/2021 | Toal et al. |
| 11,514,004 | B2 | 11/2022 | Teyer |
| 2019/0268435 | A1* | 8/2019 | Konoor ............... H04L 67/5681 |
| 2020/0327037 | A1 | 10/2020 | Toal et al. |
| 2020/0387492 | A1* | 12/2020 | Duffield ................ G06F 16/283 |
| 2021/0191947 | A1* | 6/2021 | Hariharan ......... G06F 16/24575 |
| 2021/0319306 | A1* | 10/2021 | Leite Pinheiro de Paiva ............. G06F 16/957 |
| 2023/0089783 | A1 | 3/2023 | Patel et al. |
| 2023/0092948 | A1 | 3/2023 | Viswanathan et al. |
| 2023/0099916 | A1 | 3/2023 | Teyer et al. |

* cited by examiner

*Primary Examiner* — Richard L Bowen
(74) *Attorney, Agent, or Firm* — Nicholson De Vos Webster & Elliott LLP (57) ABSTRACT

A method and apparatus for collecting and supporting querying of multi-dimensional data pertaining to usage of software and/or hardware to service tenant requests in a multi-tenant cloud computing system where the multi-dimensional data is initially captured on a per request basis and recorded in objects of a first type that store data pertaining to a specific request, specific tenant, specific host and specific time. The objects of the first type are combined by time windows to form objects of a second type. The objects of a second type are stored in another system as separate text files. Responsive to a query for multi-dimensional data for a specific tenant that spans an interval of multiple time windows, the objects of the second type for the specific tenant and time interval are combined across all hosts to generate a query result, and the query result is returned.

20 Claims, 9 Drawing Sheets

Fig. 1

```
{{
    "timestamp": 1675524300000,
    "metadata": {
        "guid": "dcc3af58-4f87-41b0-b255-f670977c169f",
        "tenant": "00Dc000003uTio",
        "host": "eu16-app1-1-cdg.ops.sfdc.net"
    },
    "dimensions": {
        "core.oracle_db_cpu_time": 110,
        "core.row_lock_timeout_count": 0,
        "core.concurrent_ui_req_error_count": 0,
        "core.apex_rest_req_time": 732,
        "core.app_cpu_time": 617,
        "core.concurrent.apex_error_count": 0,
        "core.req_count": 3,
        "core.apex_rest_req_count": 1,
        "core.ui_req_count": 1,
        "core.login_failure_count": 0,
        "core.login_success_count": 0,
        "core.ui_req_time": 42
    },
    "payload": ""
}}
```

COLLECTING AND SUPPORTING QUERYING OF HIGH-CARDINALITY TIME-SERIES DATA

CROSS-REFERENCE TO RELATED APPLICATIONS

This application claims the benefit of U.S. Provisional Application No. 63/507,098, filed Jun. 8, 2023, which is hereby incorporated by reference.

TECHNICAL FIELD

One or more implementations relate to the field of high-cardinality time-series data; and more specifically, to the collecting and supporting querying of high-cardinality time-series data in a multi-tenant environment.

DESCRIPTION OF THE RELATED ART

The cardinality of time-series data refers to all possible combinations of unique dimension (or "tag") values. For example, if one "unit" of time-series data has two dimensions (and thus is multi-dimensional), and each dimension can have 100 different values, the cardinality of this time-series is 100×100=10,000. High-cardinality time-series data processing presents challenges due to the large amounts of data that must be stored and processed, leading to long latencies, poor performance, and/or more computing resources.

In a multi-tenant cloud computing system, each tenant includes a group of users that operate electronic devices that submit requests to the multi-tenant cloud computing system. The multi-tenant cloud computing system hosts one or more multi-tenant applications that provide one or more services to the tenants. A multi-tenant cloud computing system typically includes multiple electronic devices running "hosting software" to host the multi-tenant applications. These electronic devices and hosting software are referred to with different terminology depending on implementation. For example, each electronic device may be referred to as a server device, the group of server devices may be referred to as a cluster, and the "hosting software" includes the software executed by a given server device and on top of which a multi-tenant application is executed (e.g., directly on top of an operating system, on top of a virtualization layer, etc.). As another example, in the context of a container orchestration system (COS) (e.g., Kubernetes, Docker Swarm, etc.), there may be: 1) nodes (also referred to herein as COS nodes), where a node is a representation of a single machine in a COS cluster, where that single machine can be a physical machine in a datacenter or virtual machine hosted on a cloud provider; 2) clusters (also referred to herein as COS clusters), where a cluster represents a more powerful machine resulting from pooling the resources (processors and memory) of the nodes within the cluster; 3) a COS deployment that is launched onto a cluster and that causes the spinning up and monitoring of the declared number of COS pods; 4) the spinning up a COS pod that includes executing containerized application(s) specified in the container image(s) identified for that COS pod; 5) the containerized applications that are the multi-tenant application(s); and 6) the "hosting software" that includes the software executed by the electronic devices and on top of which a multi-tenant applications are executed. Regardless, the terms "host" and "server" are used herein interchangeably to refer to an electronic device and hosting software that hosts an application (e.g., a multi-tenant application) that provides services to tenants.

Each tenant's processing may be handled by more than one of the hosts. As a result a potentially large number of requests are sent (e.g. via API calls) from the tenants to the hosts. Each of the hosts can collect multi-dimensional data (also known as metrics, performance data, request data, usage metrics, performance metrics, request metrics, tenant data, tenant metrics, tenant usage data, tenant usage metrics, etc.) regarding usage of software and/or hardware of the hosts for the requests. In addition to being multi-dimensional, this data is often high-cardinality time series data, and as such it is subject to exponential increases in cardinality whenever a new tenant is added to the system.

BRIEF DESCRIPTION OF THE DRAWINGS

The following figures use like reference numbers to refer to like elements. Although the following figures depict various example implementations, alternative implementations are within the spirit and scope of the appended claims. In the drawings:

DETAILED DESCRIPTION

The following description describes implementations for collecting and supporting querying of high-cardinality multi-dimensional time-series data pertaining to requests made by tenants and serviced by hosts in a multi-tenant system. Hardware and/or software usage data pertaining to requests and including a variety of different metrics may be initially collected, on a per-request basis, and recorded in objects of a first type. The data pertaining to requests is then processed and combined according to tenant, host and time window. The combined data is recorded in objects of a second type and stored in a separate system as a plurality of text files. Upon receiving a query from a tenant for multi-dimensional data pertaining to requests sent by the tenant to different hosts during a time interval, objects of the second type that pertain to the tenant and the time interval and the different hosts are retrieved and the data pertaining to the different hosts are further combined. The combined data is returned to the tenant as a query result. In the following description, the term "object" refers generally to a data structure for recording multi-dimensional data. As such, references to retrieving objects, combining objects, storing objects, processing objects, and similar terminology should be understood to refer to data representing the object(s).

Figure 1:
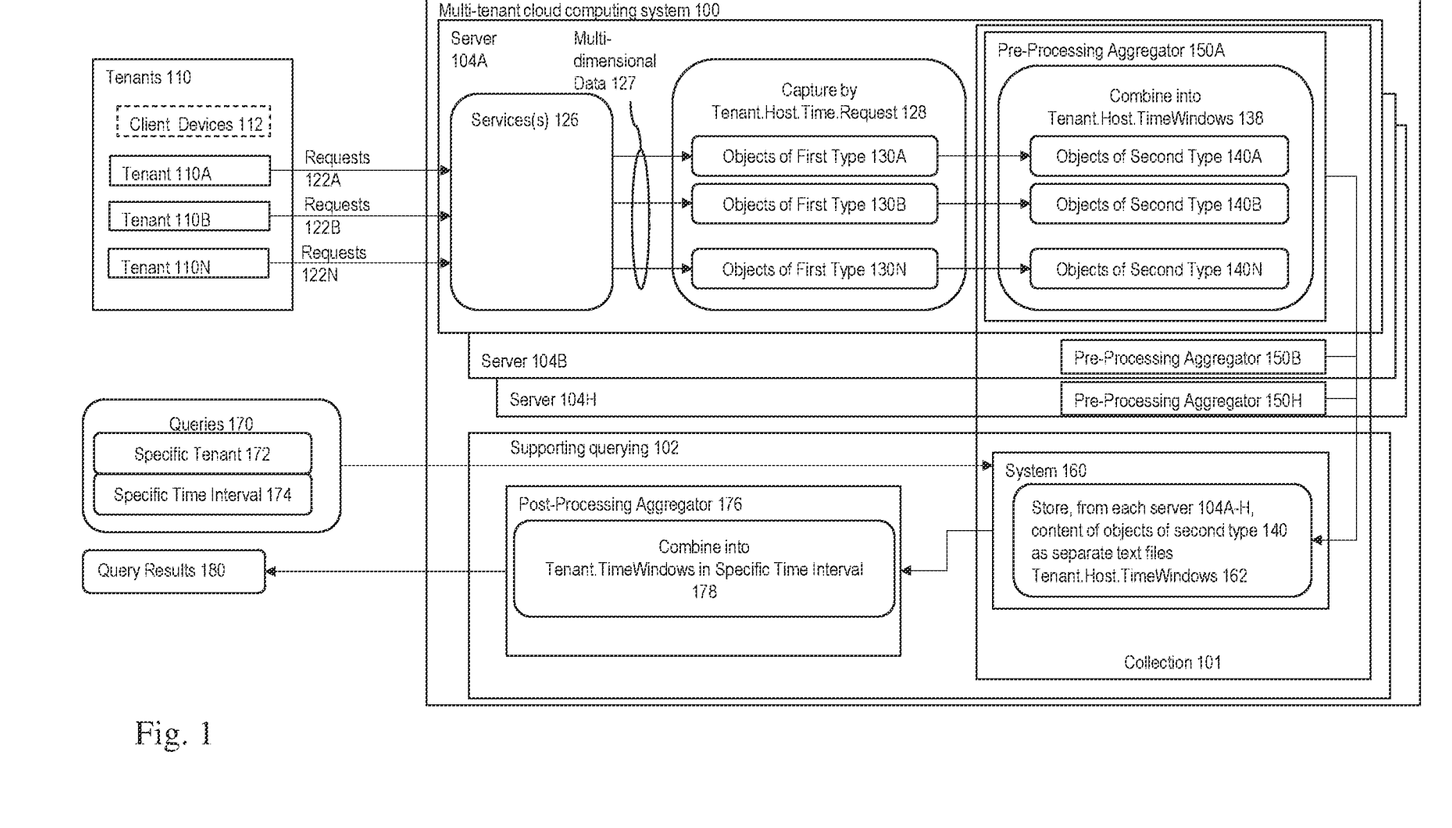
FIG. 1 is a block diagram illustrating a multi-tenant cloud computing system 100 configured for collecting and supporting querying of high-cardinality multi-dimensional data according to an example implementation.

FIG. 1 is a block diagram illustrating a multi-tenant cloud computing system 100 configured for collecting and supporting querying of high-cardinality multi-dimensional data according to an example implementation. FIG. 1 shows 1) multiple servers 104A-H, and 2) multiple client devices 112 operated by users that are part of one or more tenants 110A-N. A given user and/or a given client device 112 may be associated with a single tenant or with multiple tenants at different times. As discussed above, the terms "host" and "server" are used herein interchangeably to refer to an electronic device and hosting software that hosts an application (e.g., a multi-tenant application) that provides services to tenants.

The servers 104A-H execute instances of applications on behalf of the tenants 110 of the multi-tenant cloud computing system 100. These applications provide service(s) 126 in response to requests (e.g., 122A-N) made by the tenants 110A-N during operation of the applications. Multi-dimensional data 127 may be generated during provision of the service(s) 126. Multi-dimensional data 127 may include data pertaining to the usage of hardware and/or software to service requests made by tenants, as well as additional information as will be detailed below. Multi-dimensional data 127 is initially captured on a per-request basis as objects of a first type 130A-N. The level of granularity in the objects of the first type may be represented by the notation Tenant.Host.Time.Request, as shown in Capture by Tenant.Host.Time.Request 128 and described in more detail below.

Multi-dimensional data 127 includes various dimensions and associated dimension values. Some examples of dimensions and associated dimension values are detailed below with reference to FIG. 3.

The multi-tenant cloud computing system 100 performs the collection 101 of the multi-dimensional data. In some implementations, servers 104A-H each include a pre-processing aggregator 150 configurable to cause the server to 1) combine objects of the first type 130A-N to form objects of a second type 140A-N (illustrated in FIG. 1 inside Combine into Tenant.Host.TimeWindows 138); and 2) store in a system 160, for each server 104A-H, content of the objects of the second type as separate text files Tenant.Host.Time-Windows 162, as will be detailed below with reference to FIG. 2A.

The multi-tenant cloud computing system 100 also supports the querying 102 of the multi-dimensional data. The query can be in any form, including SQL, but need not specifically be limited to a particular form. In some implementations, the multi-tenant cloud computing system 100 further includes a post-processing aggregator 176 configurable to cause, responsive to each of a plurality of queries 170 for some of the multi-dimensional data pertaining to a specific tenant 172 and a specific time interval 174, the: 1) retrieval from the system 160 objects of the second type pertaining to the specific tenant and specific time interval; 2) combining the retrieved objects according to time windows (shown as Combine into Tenant.TimeWindows in Specific Time Interval 178) to generate a query result 180; and 3) returning the query result, as will be detailed below with reference to FIG. 2B. type query In some implementations, post-processing aggregator 176 may be part of servers 104A-H. In other implementations, post-processing aggregator 176 may be separate from servers 104A-H (for example, implemented on a separate server in the multi-tenant cloud computing system 100). In still other implementations, some of servers 104A-H may include post-processing aggregator 176 as part of the server while others of servers 104A-H may not include post-processor aggregator as part of the server.

Figure 2A:
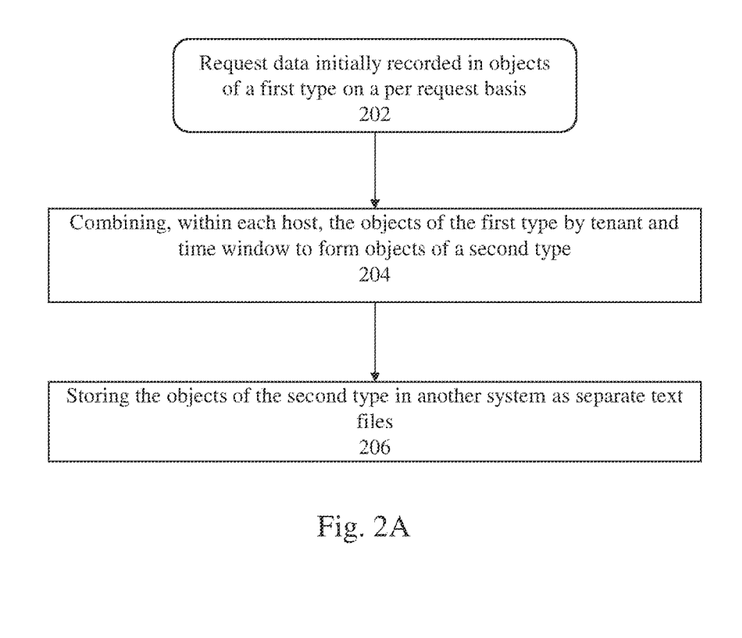
FIG. 2A is a flow diagram illustrating collecting high cardinality multi-dimensional data according to some example implementations.

FIG. 2A is a flow diagram illustrating a method for combining and storage of multi-dimensional data according to some example implementations. The flow diagram of FIG. 2A will be described with reference to the block diagram of FIG. 1, and in that context could be performed by each of the pre-processing aggregators 150A-H with the storage in the system 160. Whether or not explicitly described, the alternative implementations discussed with reference to the figure(s) illustrating block diagrams also apply to the implementations discussed with reference to the figure(s) illustrating flow diagrams, and vice versa. At the same time, the scope of this description includes implementations, other than those discussed with reference to the block diagrams, for performing the flow diagrams, and vice versa. In some implementations, FIG. 2A is performed by the pre-processing aggregator responsive to requests being received and processed at a server 104.

In block 202, multi-dimensional data is initially collected, on a per request basis. Each dimension of the data reflects a different piece of information related to the request, as the examples below will illustrate. The collected data may be associated with a timestamp indicative of the time of collection. In some implementations, the collected data is recorded in an object notation data structure, e.g. JavaScript Object Notation (JSON), XML, etc., in which each object represents a specific request, and records a plurality of name-value pairs (each being a name of a dimension and a corresponding value) associated with the request. Each object further includes additional data or metadata such as a time identifier ("timestamp"), host identifier, tenant identifier and any other pertinent information.

Figure 3:
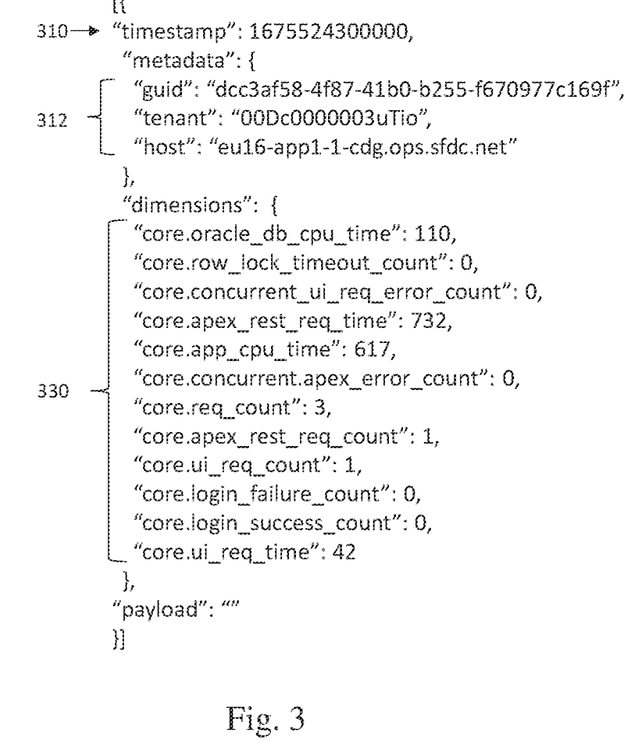
FIG. 3 is an example of a JSON data object storing multi-dimensional data and metadata.

FIG. 3 illustrates conceptually an example object implemented as a JSON object that includes a timestamp 310, metadata 312 (including a request identifier "guid", tenant identifier and host identifier), and dimensions 330 (shown as dimension names and respective dimension values).

Returning to FIG. 2A, in block 204, the objects of the first type are combined, within each host, according to tenant and time window to generate objects of a second type. In some implementations combining objects of the first type includes pre-processing the objects by grouping the objects associated with a given tenant into fixed interval "buckets" (referred to herein as "time windows") based on an object's timestamp and aggregating the multi-dimensional data within each group, as will be shown by example in FIG. 4A. While in the examples that follow, each fixed interval time window is 100 ms, the interval could be longer or shorted in alternative embodiments (e.g., between 1 ms and 500 ms). In this case, each object representing a request made by a given tenant is grouped into a specific 100 ms time window, e.g. $t_0$=0-99 ms, $t_1$=100-199 ms, $t_2$=200-299 ms, etc.

Figure 4A:
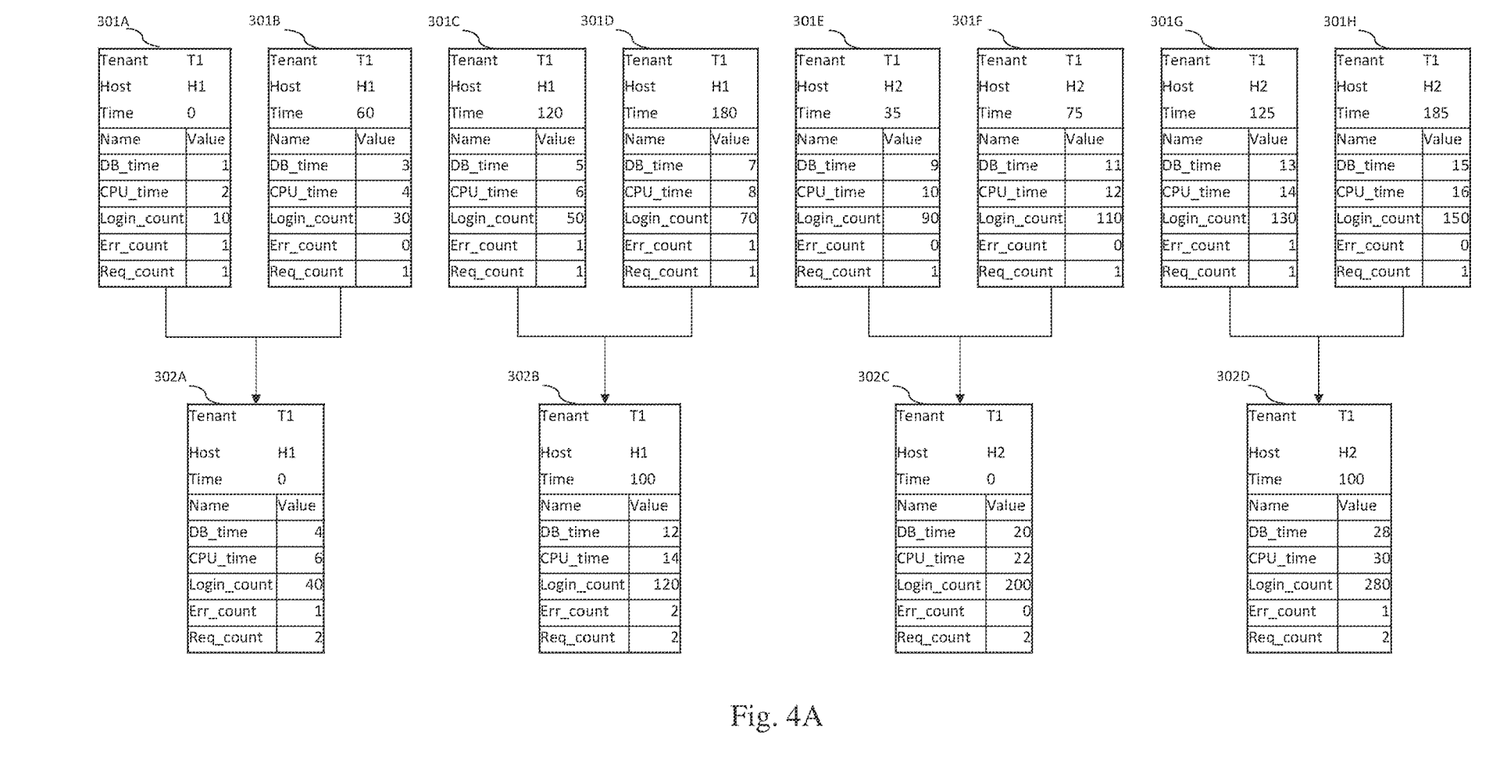
FIG. 4A is a conceptual example of combining objects of a first type according to host and time window to generate objects of a second type.

FIG. 4A illustrates conceptually aggregating multi-dimensional data within each host according to tenant and time window. For the purposes of illustration, the objects are shown as tables with rows and columns representing dimensions and associated values, however, it should be understood that in practice these objects and dimensions need not be stored in tables, but rather may be stored in structured object notation text files. Objects 301A-301H each represent objects of a first type in which the multi-dimensional data and metadata relate to a specific request, tenant, host and time. Each of objects 301A-301H includes data that identifies the tenant (e.g. a value that represents a tenant identifier), host (e.g. a value that represents a host identifier) and time (e.g. a value that represents a time identifier). Each object further includes a plurality of different dimensions that each relay some information about the request. In the illustrated example, the dimension names are "DB_time", "CPU_time", "Login_count", "Err_count", and "Req_count", however these are non-limiting and implementations may include any relevant information that can be collected on a per-request basis.

As shown in FIG. 4A, objects 301A-301D pertain to requests made by tenant T1 and received at host H1 at various times. These objects therefore contain tenant identifier "T1", host identifier "H1" and time identifiers "0", "60", "120" and "180" respectively. Data objects 301E-301H pertain to requests made by tenant T1 and received at host H2 at various times. These objects therefore contain tenant identifier "T1", host identifier "H2" and time identifiers "35", "75", "125" and "185" respectively.

The level of granularity in the object of the first type may be represented by the notation Tenant.Host.Time.Request (e.g., for object 301B, assuming that the request identifier (the guid in FIG. 3) is 12, then the notation would be T1.H1.60.12). This is illustrated in FIG. 1 by Capture by Tenant.Host.Time.Request 128. The granularity is reduced through aggregating within time windows, as illustrated in FIG. 1 by Combine into Tenant.Host.TimeWindows 138. More specifically, within each time window, like dimensions associated with a given host are combined using a predetermined aggregation operation. The predetermined aggregation operation can be the same or different for the different dimensions. Examples of aggregation operations may include, e.g. sum, average, count, min, max, etc. In FIG. 4A, objects 302A-302D are shown representing objects of the second type. Object 302A is associated with time window t=0-99 and records in an object notation data structure the combined dimension values of objects 301A and 301B, since each of object 301A and 301B represent requests made by a specific tenant (i.e. "T1") at a specific host (i.e. "H1") in the t=0-99 time window. Similarly, object 302B is associated with time window t=100-199 and therefore records the combined dimension values of objects 301C and 301D which each relate to the same tenant and host and were collected during the time window t=100-199. Likewise, object 302C is generated as a result of combining objects 301E and 301F, and object 302D is generated as the combination of objects 301G and 301H. In each of the above cases, like dimensions are combined by aggregating dimension values using an addition (i.e. "sum") operation. For example, the dimension named "DB_time" contains a value of "1" and "3" in objects 301A and 301B respectively, thereby yielding the combined dimension value of "4" for the same dimension ("DB_time") in object 302A. The remaining dimensions shown in the example follow the same pattern.

As mentioned above, the objects of the second type represent similar information as the objects of the first type but at a higher level of granularity. That is, while the objects of the first type recorded dimensions on a per-request basis (e.g., by tenant.host.time.request), the objects of the second type record dimensions on a per-time window basis (e.g., by tenant.host.timewindow); thereby reflecting the totality of requests collected for a specific tenant and host in each of a plurality of time windows. As a result, for a system in which a large number of requests are continually sent and received, it is expected that the number of objects of the second type will be substantially reduced as compared to the number of objects of the first type, thereby saving storage space, reducing processing time, and enabling more efficient querying.

Returning to FIG. 2A, in block 206 the objects of the second type are stored in another system as separate text files, i.e. as opposed to indexed records in a database. With the expectation that very little of the multi-dimensional data collected and stored will actually be queried, the text files may advantageously be stored in a separate system thereby freeing computing resources on servers 104A-H for more critical operations such as providing services 126. In some implementations, Cantor (provided by Salesforce Inc. of San Francisco, CA) is used to store the text files from the multi-tenant cloud computing system 100 to the system 160. In this case, Cantor is used in a different way than originally intended in that it acts like a logger that stores the text files without performing the compute and storage intensive indexing that would be performed if the multi-dimensional data was stored in a database. The text files may be stored in a storage system, such as a cloud storage system, for example Amazon S3™ (operated by Amazon.com, Inc. of Seattle, Washington). In some implementations, the text files are JSON files stored with hierarchical naming representing events.

Figure 2B:
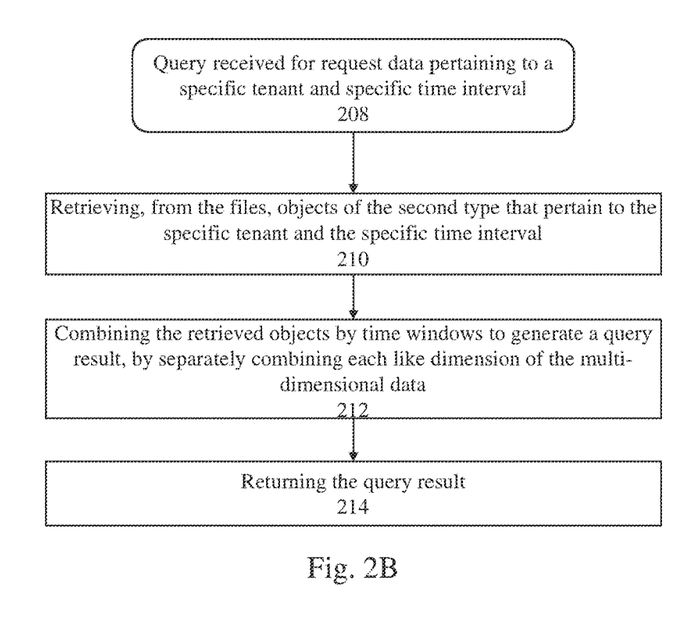
FIG. 2B is a flow diagram illustrating supporting querying of high cardinality multi-dimensional data according to some example implementations.

FIG. 2B is a flow diagram illustrating a method for querying the multi-dimensional data according to some example implementations. In block 208, a query for multi-dimensional data regarding a specific tenant during a specific time interval that spans multiple consecutive time windows is received. The query may be generated in response to data input by a user through a user interface of a client device. The user interface may be a graphical user interface (GUI) configured to obtain data from a user such as parameter values and generate a query based on the obtained data. The obtained data and associated query may include a value or set of values representing a time interval for which the user is interested in retrieving multi-dimensional data. The time interval value or set of values may be represented by a start time and end time. In some implementations, a microservice (e.g., Metro provided by Salesforce Inc. of San Francisco, CA) provides a low latency application program interface (API) to receive the parameter values and submit them to Cantor. In response, Cantor generates a query to retrieve the appropriate text files. In some implementations that use Amazon S3, the query generated by Cantor uses "S3 select" to filter the stored JSON files down to those that are needed.

In block 210, responsive to the received query, the objects of the second type that pertain to the specific tenant and specific time interval are retrieved. The objects of the second type that pertain to the tenant and the time interval are those objects that record multi-dimensional data associated with requests made by the tenant during the time interval. For example, referring to the example of FIG. 4A, if a query is received for multi-dimensional data pertaining to tenant "T1" and time interval t=0-199 ms, objects 302A-302D are retrieved from the stored text files.

Figure 4B:
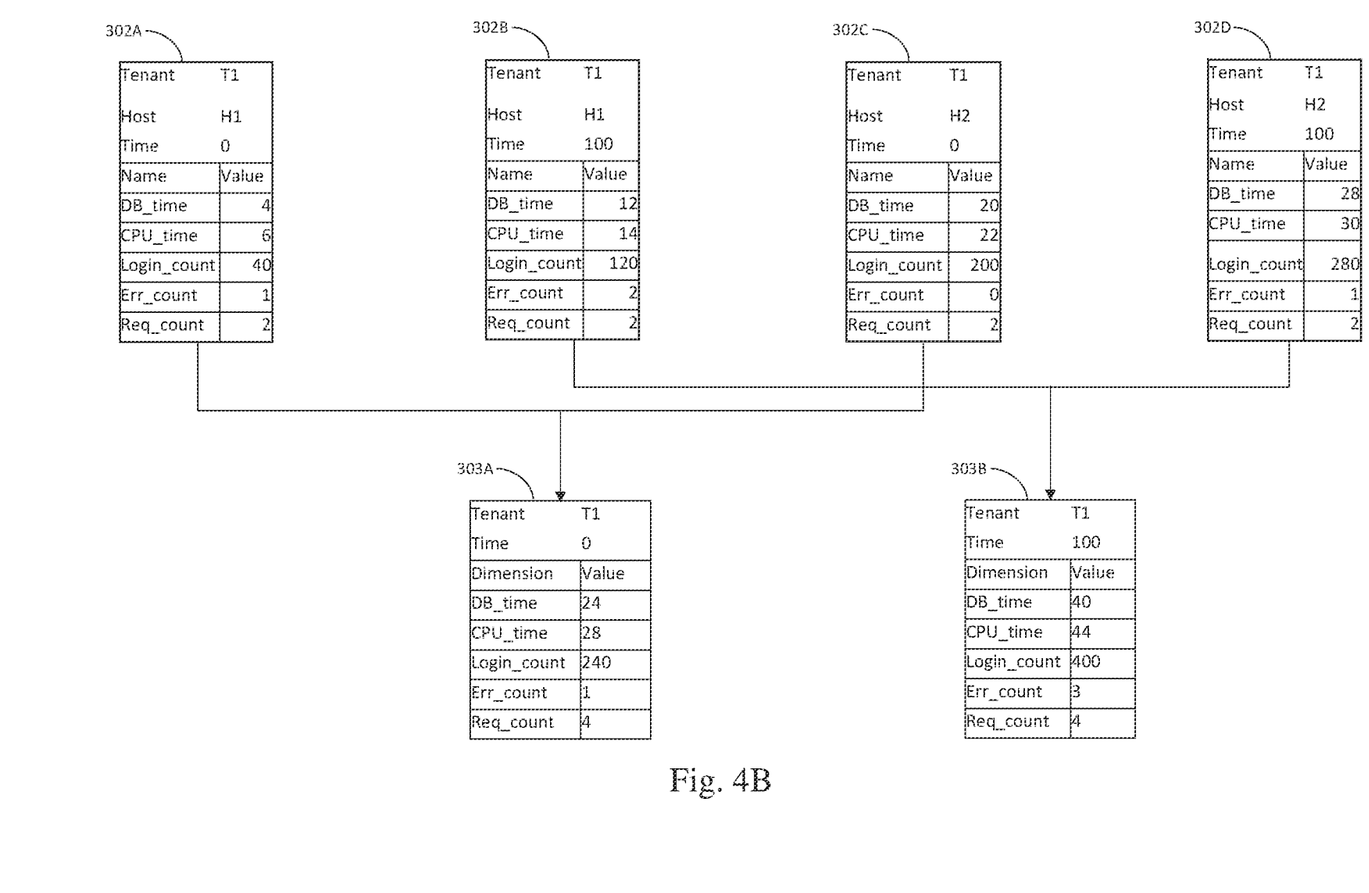
FIG. 4B is a conceptual example combining objects of the second type according to time windows.

In block 212, the retrieved objects are combined to generate a query result. Combining the objects of the second type includes separately processing the objects retrieved for each time window in the specific time interval by aggregating dimension values for like dimensions using a predetermined aggregation operation. As mentioned above, the predetermined aggregation operation can be the same or different for different dimensions. The now combined data represents the totality of requests made to all hosts by the specific tenant in each of a plurality of consecutive time windows within the specific time interval. For example, referring to FIG. 4B, objects 302A and 302C associated with hosts "H1" and "H2" respectively, are combined because objects 302A and 302C both pertain to the time window t=0-99 ms. The combination of objects 302A and 302C is shown illustratively as object 303A in which like dimensions of objects 302A and 302C are aggregated using a "sum" operation. Similarly, objects 302B and 302D respectively associated with hosts "H1" and "H2" are combined as these objects both pertain to the time window t=100-199 ms. However it should be understood that reference to objects 303A and 303B are for illustrative purposes only. In practice, the combined data may not be stored in objects but rather returned to the requestor in the form of a query result. In some implementations, a microservice (e.g., Metro) is used to perform the post-processing (and thus operate as the post-processing aggregator 176). Since both Cantor and Metro are relatively thin layers, and Amazon S3 is used for both collection and to support querying, such implementations are relatively cost effective.

In implementations like that described above in which the system 160 is used for both storage as part of collection 101 and to support querying 102, such implementations are relatively cost effective. For example, where Amazon S3 is used for the collection 101 (the storage part) and the supporting querying 102 (the retrieval of the text files). Also, the manner in which the collection 101 and supporting of querying 102 is performed allows for relatively low requirements for the software; namely, that used to: 1) manage the storage of the content of the objects of the second type 140A-N into the system 160 and to manage the retrieval of the needed text files from the system 160 (e.g., Cantor); and 2) to manage incoming parameters for queries and to combine retrieved text files (e.g., Metro).

Figure 5A:
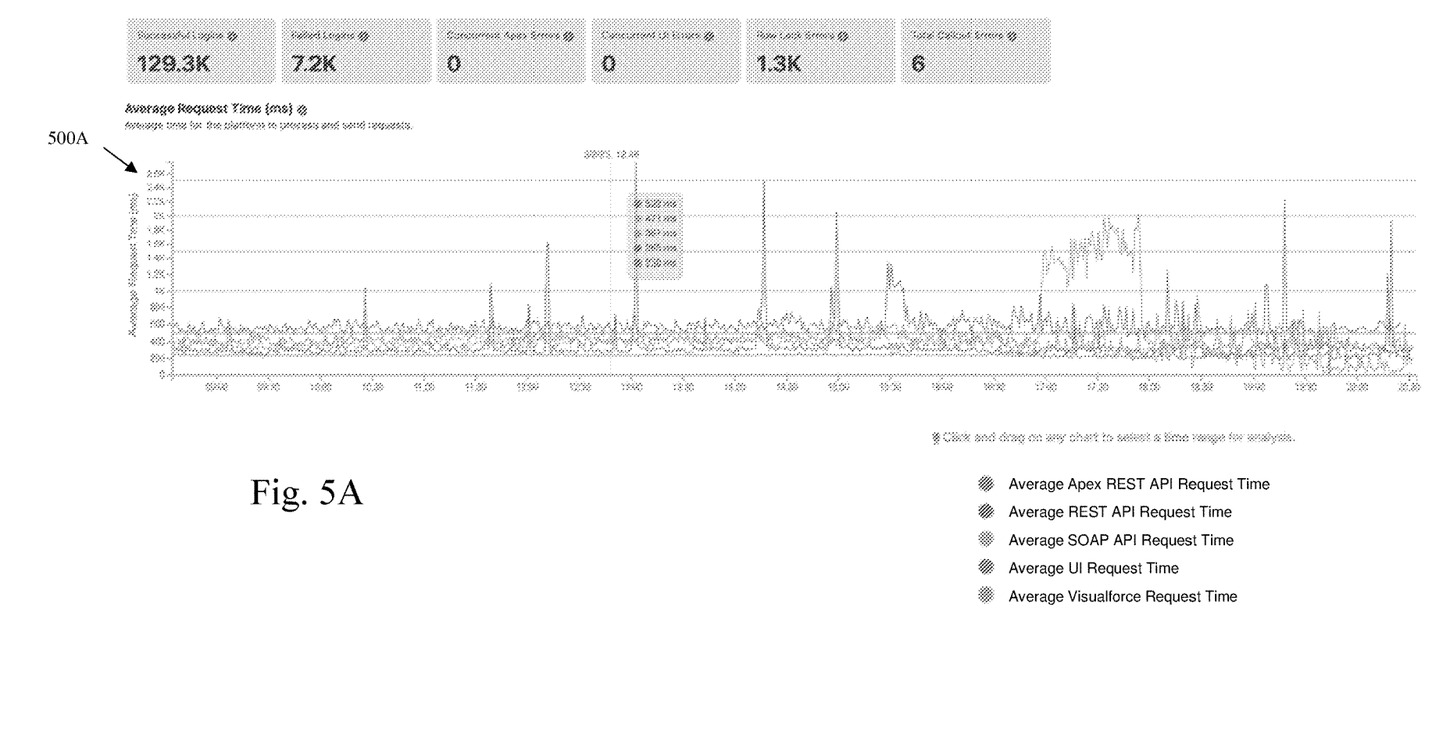
FIG. 5A is an example of an output representing a query result (Average Request Time).
Figure 5B:
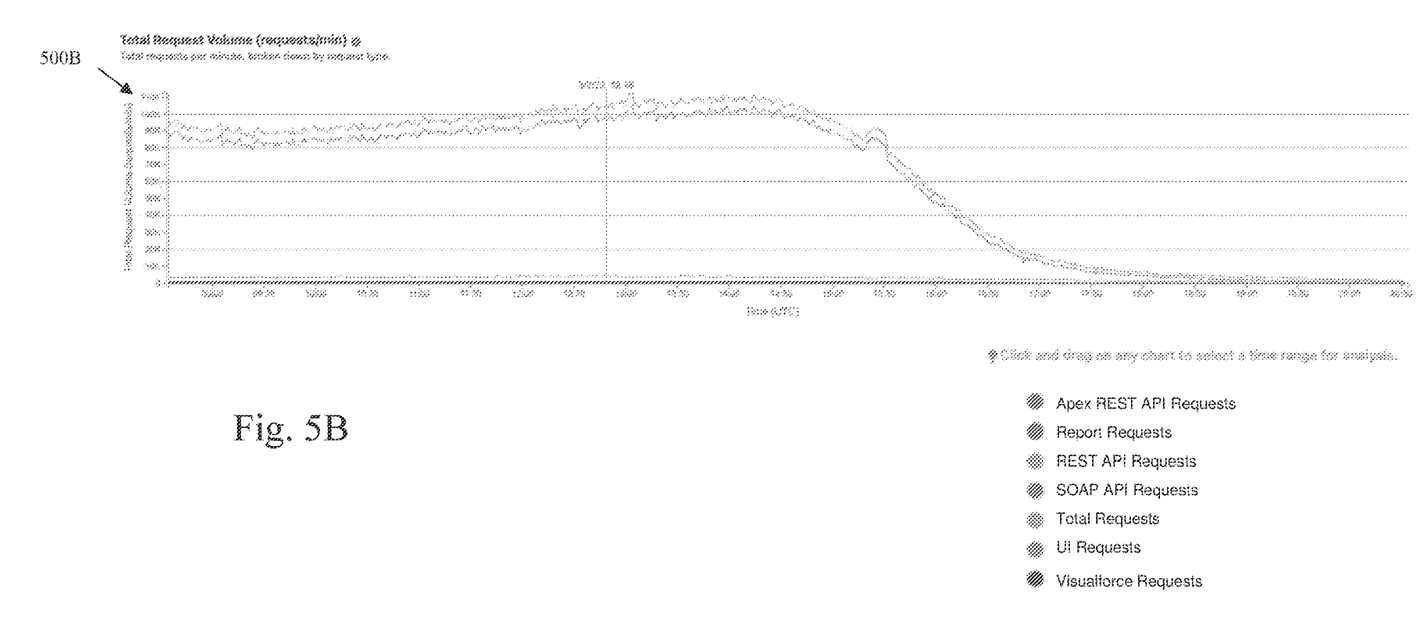
FIG. 5B is an example of an output representing a query result (Total Request Volume).
Figure 5C:
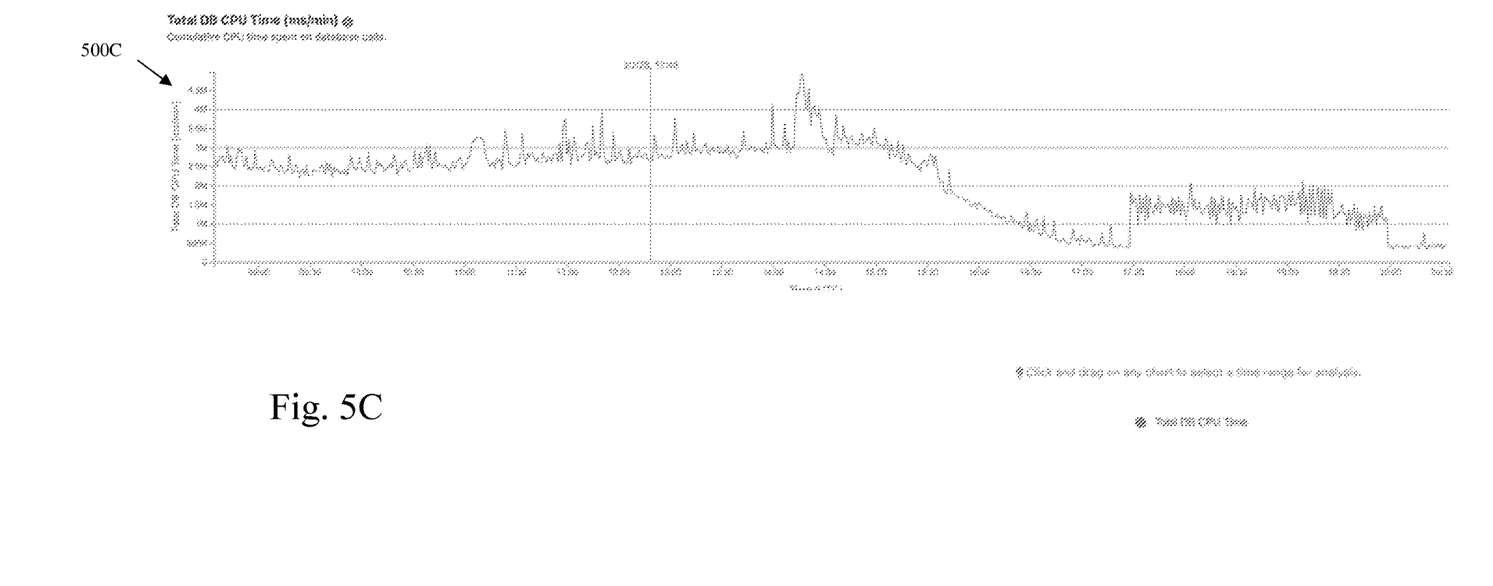
FIG. 5C is an example of an output representing a query result (Total DB CPU Time).

In block 214, a query result indicative of multi-dimensional data pertaining to the specific tenant and specific time interval is returned. The query result reflects multi-dimensional data pertaining to the specific tenant and specific time interval, grouped into separate time windows within the specific time interval. The query result may be displayed in a user interface of a client device, such as a graphical user interface. The query result may be displayed in the form of one or more time-series graphs as illustrated by example in FIGS. 5A-5C showing time series graphs 500A-C representing query results for "Average Request Time", "Total Request Volume" and "Total DB CPU Time", respectively, in which the horizontal axis represents the time interval (in this case 08:30-20:30). In each of graphs 500A-C, the vertical axis represents corresponding values of one or more dimensions of the multi-dimensional data pertaining to a specific tenant combined across all hosts. The names of the one or more dimensions are displayed to the right of each respective graph. Due to smoothing over a long period time (12 hours), neither the time windows nor the individual data points that make up the query result are visible in graphs 500A-C.

Example Electronic Devices and Environments
Electronic Device and Machine-Readable Media One or more parts of the above implementations may include software. Software is a general term whose meaning can range from part of the code and/or metadata of a single computer program to the entirety of multiple programs. A computer program (also referred to as a program) comprises code and optionally data. Code (sometimes referred to as computer program code or program code) comprises software instructions (also referred to as instructions). Instructions may be executed by hardware to perform operations. Executing software includes executing code, which includes executing instructions. The execution of a program to perform a task involves executing some or all of the instructions in that program.

An electronic device (also referred to as a device, computing device, computer, machine, etc.) includes hardware and software. For example, an electronic device may include a set of one or more processors coupled to one or more machine-readable storage media (e.g., non-volatile memory such as magnetic disks, optical disks, read only memory (ROM), Flash memory, phase change memory, solid state drives (SSDs)) to store code and optionally data. For instance, an electronic device may include non-volatile memory (with slower read/write times) and volatile memory (e.g., dynamic random-access memory (DRAM), static random-access memory (SRAM)). Non-volatile memory persists code/data even when the electronic device is turned off or when power is otherwise removed, and the electronic device copies that part of the code that is to be executed by the set of processors of that electronic device from the non-volatile memory into the volatile memory of that electronic device during operation because volatile memory typically has faster read/write times. As another example, an electronic device may include a non-volatile memory (e.g., phase change memory) that persists code/data when the electronic device has power removed, and that has sufficiently fast read/write times such that, rather than copying the part of the code to be executed into volatile memory, the code/data may be provided directly to the set of processors (e.g., loaded into a cache of the set of processors). In other words, this non-volatile memory operates as both long term storage and main memory, and thus the electronic device may have no or only a small amount of volatile memory for main memory.

In addition to storing code and/or data on machine-readable storage media, typical electronic devices can transmit and/or receive code and/or data over one or more machine-readable transmission media (also called a carrier) (e.g., electrical, optical, radio, acoustical or other forms of propagated signals—such as carrier waves, and/or infrared signals). For instance, typical electronic devices also include a set of one or more physical network interface(s) to establish network connections (to transmit and/or receive code and/or data using propagated signals) with other electronic devices. Thus, an electronic device may store and transmit (internally and/or with other electronic devices over a network) code and/or data with one or more machine-readable media (also referred to as computer-readable media).

Software instructions (also referred to as instructions) are capable of causing (also referred to as operable to cause and configurable to cause) a set of processors to perform operations when the instructions are executed by the set of processors. The phrase "capable of causing" (and synonyms mentioned above) includes various scenarios (or combinations thereof), such as instructions that are always executed versus instructions that may be executed. For example, instructions may be executed: 1) only in certain situations when the larger program is executed (e.g., a condition is fulfilled in the larger program; an event occurs such as a software or hardware interrupt, user input (e.g., a keystroke, a mouse-click, a voice command); a message is published, etc.); or 2) when the instructions are called by another program or part thereof (whether or not executed in the same or a different process, thread, lightweight thread, etc.). These scenarios may or may not require that a larger program, of which the instructions are a part, be currently configured to use those instructions (e.g., may or may not require that a user enables a feature, the feature or instructions be unlocked or enabled, the larger program is configured using data and the program's inherent functionality, etc.). As shown by these exemplary scenarios, "capable of causing" (and synonyms mentioned above) does not require "causing" but the mere capability to cause. While the term "instructions" may be used to refer to the instructions that when executed cause the performance of the operations described herein, the term may or may not also refer to other instructions that a program may include. Thus, instructions, code, program, and software are capable of causing operations when executed, whether the operations are always performed or sometimes performed (e.g., in the scenarios described previously). The phrase "the instructions when executed" refers to at least the instructions that when executed cause the performance of the operations described herein but may or may not refer to the execution of the other instructions.

Electronic devices are designed for and/or used for a variety of purposes, and different terms may reflect those purposes (e.g., user devices, network devices). Some user devices are designed to mainly be operated as servers (sometimes referred to as server devices), while others are designed to mainly be operated as clients (sometimes referred to as client devices, client computing devices, client computers, or end user devices; examples of which include desktops, workstations, laptops, personal digital assistants, smartphones, wearables, augmented reality (AR) devices, virtual reality (VR) devices, mixed reality (MR) devices, etc.). The software executed to operate a user device (typically a server device) as a server may be referred to as server software or server code), while the software executed to operate a user device (typically a client device) as a client may be referred to as client software or client code. A server provides one or more services to one or more clients.

The term "user" refers to an entity (e.g., an individual person) that uses an electronic device. Software and/or services may use credentials to distinguish different accounts associated with the same and/or different users. Users can have one or more roles, such as administrator, programmer/developer, and end user roles. As an administrator, a user typically uses electronic devices to administer them for other users, and thus an administrator often works directly and/or indirectly with server devices and client devices.

Figure 6A:
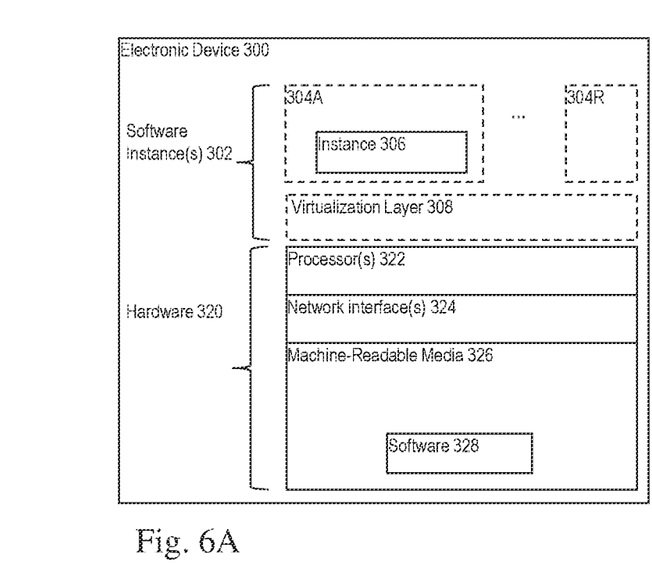
FIG. 6A is a block diagram illustrating an electronic device according to some example implementations.

FIG. 6A is a block diagram illustrating an electronic device 300 according to some example implementations. FIG. 6A includes hardware 320 comprising a set of one or more processor(s) 322, a set of one or more network interfaces 324 (wireless and/or wired), and machine-readable media 326 having stored therein software 328 (which includes instructions executable by the set of one or more processor(s) 322). The machine-readable media 326 may include non-transitory and/or transitory machine-readable media. Each of the previously described clients and services (as well as the collecting and supporting querying of high-cardinality time-series data reflecting usage of hardware and/or software in providing the service(s)) may be implemented in one or more of electronic device 300. In one implementation: 1) each of the clients is implemented in a separate one of the electronic device 300 (e.g., in end user devices where the software 328 represents the software to implement clients to interface directly and/or indirectly with the service(s) and query for multi-dimensional data (e.g., software 328 represents a web browser, a native client, a portal, a command-line interface, and/or an application programming interface (API) based upon protocols such as Simple Object Access Protocol (SOAP), Representational State Transfer (REST), etc.)); 2) the services (as well as the collecting and supporting querying of high-cardinality time-series data reflecting usage of hardware and/or software in providing the service(s)) are implemented in a separate set of one or more of electronic device 300 (e.g., a set of one or more server devices where the software 328 represents the software to implement the services (as well as the collecting and supporting querying of high-cardinality time-series data reflecting usage of hardware and/or software in providing the service(s))); and 3) in operation, the electronic devices implementing the clients and the services (as well as the collecting and supporting querying of high-cardinality time-series data reflecting usage of hardware and/or software in providing the service(s)) would be communicatively coupled (e.g., by a network) and would establish between them (or through one or more other layers and/or or other services) connections for submitting queries for usage data and returning query results to the clients. Other configurations of electronic devices may be used in other implementations (e.g., an implementation in which the client and the services are implemented on a single one of electronic device 300).

During operation, an instance of the software 328 (illustrated as instance 306 and referred to as a software instance; and in the more specific case of an application, as an application instance) is executed. In electronic devices that use compute virtualization, the set of one or more processor(s) 322 typically execute software to instantiate a virtualization layer 308 and a set of one or more software containers, shown as software container 304A to software container 304R (e.g., with operating system-level virtualization, the virtualization layer 308 may represent a container engine (such as Docker Engine by Docker, Inc. or rkt in Container Linux by Red Hat, Inc.) running on top of (or integrated into) an operating system, and it allows for the creation of multiple software containers (representing separate user space instances and also called virtualization engines, virtual private servers, or jails) that may each be used to execute a set of one or more applications; with full virtualization, the virtualization layer 308 represents a hypervisor (sometimes referred to as a virtual machine monitor (VMM)) or a hypervisor executing on top of a host operating system, and the software containers each represent a tightly isolated form of a software container called a virtual machine that is run by the hypervisor and may include a guest operating system; with para-virtualization, an operating system and/or application running with a virtual machine may be aware of the presence of virtualization for optimization purposes). Again, in electronic devices where compute virtualization is used, during operation, an instance of the software 328 is executed within the software container 304A on the virtualization layer 308. In electronic devices where compute virtualization is not used, the instance 306 on top of a host operating system is executed on the "bare metal" electronic device 300. Instances of the software 328, as well as the virtualization layer 308 and the software containers if implemented, are collectively referred to as software instance(s) 302.

Alternative implementations of an electronic device may have numerous variations from that described above. For example, customized hardware and/or accelerators might also be used in an electronic device.

Example Environment

Figure 6B:
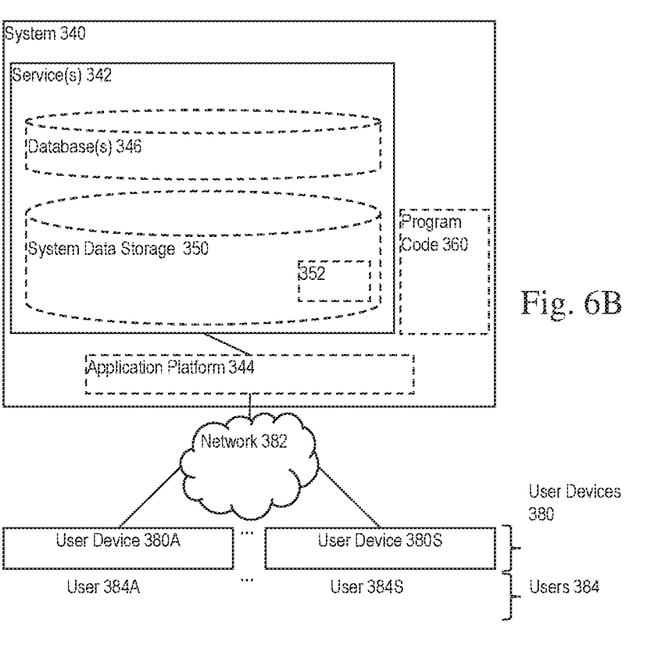
FIG. 6B is a block diagram of a deployment environment according to some example implementations.

FIG. 6B is a block diagram of a deployment environment according to some example implementations. A system 340 includes hardware (e.g., a set of one or more server devices) and software to provide service(s) 342, as well as collecting and supporting querying of high-cardinality time-series data reflect usage of hardware and/or software in providing the service(s) 342. In some implementations the system 340 is in one or more datacenter(s). These datacenter(s) may be: 1) first party datacenter(s), which are datacenter(s) owned and/or operated by the same entity that provides and/or operates some or all of the software that provides the service(s) 342; and/or 2) third-party datacenter(s), which are datacenter(s) owned and/or operated by one or more different entities than the entity that provides the service(s) 342 (e.g., the different entities may host some or all of the software provided and/or operated by the entity that provides the service(s) 342). For example, third-party datacenters may be owned and/or operated by entities providing public cloud services (e.g., Amazon.com, Inc. (Amazon Web Services), Google LLC (Google Cloud Platform), Microsoft Corporation (Azure)).

The system 340 is coupled to user devices 380 (shown as user device 380A to user device 380S) over a network 382. The service(s) 342 may be on-demand services that are made available to users 384 (shown as user 384A to user 384S) working for one or more entities other than the entity which owns and/or operates the on-demand services (those users sometimes referred to as outside users) so that those entities need not be concerned with building and/or maintaining a system, but instead may make use of the service(s) 342 when needed (e.g., when needed by the users). The service(s) 342 may communicate with each other and/or with one or more of the user devices 380 via one or more APIs (e.g., a REST API). In some implementations, the user devices 380 are operated by the users 384, and each may be operated as a client device and/or a server device. In some implementations, one or more of the user devices 380 are separate ones of the electronic device 300 or include one or more features of the electronic device 300.

In some implementations, the system 340 is a multi-tenant system (also known as a multi-tenant architecture). The term multi-tenant system refers to a system in which various elements of hardware and/or software of the system may be shared by one or more tenants. A multi-tenant system may be operated by a first entity (sometimes referred to a multi-tenant system provider, operator, or vendor; or simply a provider, operator, or vendor) that provides one or more services to the tenants (in which case the tenants are customers of the operator and sometimes referred to as operator customers). A tenant typically includes a group of users with access to at least some of the same data/functionality with the same or similar privileges/permissions. Tenants may be different entities (e.g., different companies, different departments/divisions of a company, and/or other types of entities), and some or all these entities may be vendors that sell or otherwise provide products and/or services to their customers (sometimes referred to as tenant customers). A multi-tenant system may allow each tenant to input tenant specific data for user management, tenant-specific functionality, configuration, customizations, non-functional properties, associated applications, etc. A tenant may have one or more roles relative to a system and/or service. For example, in the context of a customer relationship management (CRM) system or service, a tenant may be a vendor using the CRM system or service to manage information the tenant has regarding one or more customers of the vendor. As another example, in the context of Data as a Service (DAAS), one set of tenants may be vendors providing data and another set of tenants may be customers of different ones or all the vendors' data. As another example, in the context of Platform as a Service (PAAS), one set of tenants may be third-party application developers providing applications/services and another set of tenants may be customers of different ones or all the third-party application developers.

Multi-tenancy can be implemented in different ways. In some implementations, a multi-tenant architecture may include software instance(s) that are shared by multiple tenants (e.g., a single database instance share by multiple tenants, sometime referred to as a multi-tenant database; a single application instance shared by multiple tenants, sometimes referred to as a multi-tenant application; a single application instance and a single database instance shared by multiple tenants; an application instance per tenant and a database instance shared by multiple tenants; a single application instance shared by multiple tenants and a database instance per tenant).

In one implementation, the system 340 is a multi-tenant cloud computing architecture supporting multiple services, such as one or more of the following types of services: Customer relationship management (CRM); Configure, price, quote (CPQ); Business process modeling (BPM); Customer support; Marketing; External data connectivity; Productivity; Database-as-a-Service; Data-as-a-Service (DAAS or DaaS); Platform-as-a-service (PAAS or PaaS); Infrastructure-as-a-Service (IAAS or IaaS) (e.g., virtual machines, servers, and/or storage); Analytics; Community; Internet-of-Things (IoT); Industry-specific; Artificial intelligence (AI); Application marketplace ("app store"); Data modeling; Security; and Identity and access management (IAM). For one or more of these services, the system 340 also implements the collecting and supporting querying of high-cardinality time-series data reflecting usage of hardware and/or software in providing the service(s)) as described above.

For example, system 340 may include an application platform 344 that enables PAAS for creating, managing, and executing one or more applications developed by the provider of the application platform 344, users accessing the system 340 via one or more of the user devices 380, or third-party application developers accessing the system 340 via one or more of user devices 380.

In some implementations, one or more of the service(s) 342 may use one or more database(s) 346 and/or system data storage 350 (which stores system data 352). In certain implementations, the system 340 includes a set of one or more servers that are running on server electronic devices and that are configured to handle requests for any authorized user associated with any tenant (there is no server affinity for a user and/or tenant to a specific server). The user devices 380 communicate with the server(s) of system 340 to request and update tenant-level data and system-level data hosted by system 340, and in response the system 340 (e.g., one or more servers in system 340) automatically may generate one or more Structured Query Language (SQL) statements (e.g., one or more SQL queries) that are designed to access the desired information from the database(s) 346 and/or system data storage 350.

In some implementations, the service(s) 342 are implemented using virtual applications dynamically created at run time responsive to queries from the user devices 380 and in accordance with metadata, including: 1) metadata that describes constructs (e.g., forms, reports, workflows, user access privileges, business logic) that are common to multiple tenants; and/or 2) metadata that is tenant specific and describes tenant specific constructs (e.g., tables, reports, dashboards, interfaces, etc.) and is stored in a multi-tenant database. To that end, the program code 360 may be a runtime engine that materializes application data from the metadata; that is, there is a clear separation of the compiled runtime engine (also known as the system kernel), tenant data, and the metadata, which makes it possible to independently update the system kernel and tenant-specific applications and schemas, with virtually no risk of one affecting the others. Further, in one implementation, the application platform 344 includes an application setup mechanism that supports application developers' creation and management of applications, which may be saved as metadata by save routines. Invocations to such applications, including the pre-processing aggregator, may be coded using Procedural Language/Structured Object Query Language (PL/SOQL) that provides a programming language style interface. Invocations to applications may be detected by one or more system processes, which manages retrieving application metadata for the tenant making the invocation and executing the metadata as an application in a software container (e.g., a virtual machine).

Network 382 may be any one or any combination of a LAN (local area network), WAN (wide area network), telephone network, wireless network, point-to-point network, star network, token ring network, hub network, or other appropriate configuration. The network may comply with one or more network protocols, including an Institute of Electrical and Electronics Engineers (IEEE) protocol, a 3rd Generation Partnership Project (3GPP) protocol, a $4^{th}$ generation wireless protocol (4G) (e.g., the Long Term Evolution (LTE) standard, LTE Advanced, LTE Advanced Pro), a fifth generation wireless protocol (5G), and/or similar wired and/or wireless protocols, and may include one or more intermediary devices for routing data between the system 340 and the user devices 380.

Each of the user devices 380 (such as a desktop personal computer, workstation, laptop, Personal Digital Assistant (PDA), smartphone, smartwatch, wearable device, augmented reality (AR) device, virtual reality (VR) device, etc.) typically includes one or more user interface devices, such as a keyboard, a mouse, a trackball, a touch pad, a touch screen, a pen or the like, video or touch free user interfaces, for interacting with a graphical user interface (GUI) provided on a display (e.g., a monitor screen, a liquid crystal display (LCD), a head-up display, a head-mounted display, etc.) in conjunction with pages, forms, applications and other information provided by system 340. For example, the user interface device can be used to access data and applications hosted by system 340, and to perform searches on stored data, and otherwise allow one or more of users 384 to interact with various GUI pages that may be presented to the one or more of users 384. The user devices 380 may communicate with system 340 using TCP/IP (Transfer Control Protocol and Internet Protocol) and, at a higher network level, use other networking protocols to communicate, such as Hypertext Transfer Protocol (HTTP), File Transfer Protocol (FTP), Andrew File System (AFS), Wireless Application Protocol (WAP), Network File System (NFS), an application program interface (API) based upon protocols such as Simple Object Access Protocol (SOAP), Representational State Transfer (REST), etc. In an example where HTTP is used, one or more the user devices 380 may include an HTTP client, commonly referred to as a "browser," for sending and receiving HTTP messages to and from server(s) of system 340, thus allowing one or more of the users 384 to access, process and view information, pages and applications available from system 340 over network 382.

CONCLUSION

In the above description, numerous specific details such as resource partitioning/sharing/duplication implementations, types and interrelationships of system components, and logic partitioning/integration choices are set forth in order to provide a more thorough understanding. The invention may be practiced without such specific details, however. In other instances, control structures, logic implementations, opcodes, means to specify operands, and full software instruction sequences have not been shown in detail since those of ordinary skill in the art, with the included descriptions, will be able to implement what is described without undue experimentation.

References in the specification to "one implementation," "an implementation," "an example implementation," etc., indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, and/or characteristic is described in connection with an implementation, one skilled in the art would know to affect such feature, structure, and/or characteristic in connection with other implementations whether or not explicitly described.

For example, the figure(s) illustrating flow diagrams sometimes refer to the figure(s) illustrating block diagrams, and vice versa. Whether or not explicitly described, the alternative implementations discussed with reference to the figure(s) illustrating block diagrams also apply to the implementations discussed with reference to the figure(s) illustrating flow diagrams, and vice versa. At the same time, the scope of this description includes implementations, other than those discussed with reference to the block diagrams, for performing the flow diagrams, and vice versa.

Bracketed text and blocks with dashed borders (e.g., large dashes, small dashes, dot-dash, and dots) may be used herein to illustrate optional operations and/or structures that add additional features to some implementations. However, such notation should not be taken to mean that these are the only options or optional operations, and/or that blocks with solid borders are not optional in certain implementations.

The detailed description and claims may use the term "coupled," along with its derivatives. "Coupled" is used to indicate that two or more elements, which may or may not be in direct physical or electrical contact with each other, co-operate or interact with each other.

While the flow diagrams in the figures show a particular order of operations performed by certain implementations, such order is exemplary and not limiting (e.g., alternative implementations may perform the operations in a different order, combine certain operations, perform certain operations in parallel, overlap performance of certain operations such that they are partially in parallel, etc.).

While the above description includes several example implementations, the invention is not limited to the implementations described and can be practiced with modification and alteration within the spirit and scope of the appended claims. The description is thus illustrative instead of limiting.

What is claimed is:

1. An article of manufacture comprising:
a non-transitory machine-readable storage medium that provides instructions that, if executed by a set of one or more processors implemented in an electronic device, are configurable to cause the electronic device to perform operations for collecting and supporting, for one or more tenants in a multi-tenant cloud computing system, querying of data pertaining to usage of software and/or hardware to service requests made by those tenants in the multi-tenant cloud computing system, wherein such data is high-cardinality and multi-dimensional, where the data is initially captured on a per request basis such that there is an object of a first type for each request, objects of the first type store multi-dimensional data pertaining to usage of software and hardware for a specific request made by a specific tenant at a specific host at a specific time, the operations comprising:
within each host, combining the objects of the first type for each tenant by time windows to form objects of a second type, wherein the combining includes separately combining each like dimension of the multi-dimensional data, such that the objects of the second type store, for each dimension of the multi-dimensional data, data that represents the totality of requests made by each tenant in each time window at a specific host;
storing the objects of the second type in another system as separate text files as opposed to indexed records in a database; and
responsive to a query regarding usage of software and/or hardware regarding a specific one of the tenants during a specific time interval that spans multiple consecutive time windows:
retrieving, from the files, objects of the second type that pertain to the specific tenant and the specific time interval,
combining the retrieved objects of the second type by time windows to generate a query result, wherein the combining includes separately combining each like dimension of the multi-dimensional data, such that the query result includes, for each dimension of the multi-dimensional data, data that represents the totality of requests made to the hosts by the specific tenant in each of the time windows in the specific time interval, and
returning the query result.

2. The article of manufacture of claim 1, wherein combining the objects of the first type and combining objects of second type includes aggregating one or more first dimensions by applying a first aggregation operation to respective first dimension values.

3. The article of manufacture of claim 2, wherein combining the objects of the first type and combining objects of second type includes aggregating one or more second dimensions by applying a second aggregation operation, different than the first aggregation operation, to respective second dimension values.

4. The article of manufacture of claim 1, wherein the objects of the first type and the objects of the second type are stored in structured object notation format.

5. The article of manufacture of claim 4, wherein the objects of the first type and the objects of the second type are stored in JavaScript Object Notation (JSON) format.

6. The article of manufacture of claim 1, the operations further comprising:
causing the query result to be displayed on a graphical user interface of a client device.

7. The article of manufacture of claim 1, wherein the time window is in the range of 1 ms-500 ms.

8. A method for collecting and supporting, for one or more tenants in a multi-tenant cloud computing system, querying of data pertaining to usage of software and/or hardware to service requests made by those tenants in the multi-tenant cloud computing system, wherein such data is high-cardinality and multi-dimensional, where the data is initially captured on a per request basis such that there is an object of a first type for each request, objects of the first type store multi-dimensional data pertaining to usage of software and/or hardware for a specific request made by a specific tenant at a specific host at a specific time, the method comprising:
within each host, combining the objects of the first type for each tenant by time windows to form objects of a second type, wherein the combining includes separately combining each like dimension of the multi-dimensional data, such that the objects of the second type store, for each dimension of the multi-dimensional data, data that represents the totality of requests made by each tenant in each time window at a specific host;
storing the objects of the second type in another system as separate text files as opposed to indexed records in a database; and
responsive to a query regarding usage of software and/or hardware regarding a specific one of the tenants during a specific time interval that spans multiple consecutive time windows:
retrieving, from the files, objects of the second type that pertain to the specific tenant and the specific time interval,
combining the retrieved objects of the second type by time windows to generate a query result, wherein the combining includes separately combining each like dimension of the multi-dimensional data, such that the query result includes, for each dimension of the multi-dimensional data, data that represents the totality of requests made to the hosts by the specific tenant in each of the time windows in the specific time interval, and
returning the query result.

9. The method of claim 8, wherein combining the objects of the first type and combining objects of second type includes aggregating one or more first dimensions by applying a first aggregation operation to respective first dimension values.

10. The method of claim 9, wherein combining the objects of the first type and combining objects of second type includes aggregating one or more second dimensions by applying a second aggregation operation, different than the first aggregation operation, to respective second dimension values.

11. The method of claim 8, wherein the objects of the first type and the objects of the second type are stored in structured object notation format.

12. The method of claim 11, wherein the objects of the first type and the objects of the second type are stored in JavaScript Object Notation (JSON) format.

13. The method of claim 8, further comprising:
causing the query result to be displayed on a graphical user interface of a client device.

14. The method of claim 8, wherein the time window is in the range of 1 ms-500 ms.

15. An apparatus comprising:
a set of one or more processors; and
a non-transitory machine-readable storage medium that provides instructions that, if executed by the set of one or more processors, are configurable to cause the apparatus to perform operations for collecting and supporting, for one or more tenants in a multi-tenant cloud computing system, querying of data pertaining to usage of software and/or hardware to service requests made by those tenants in the multi-tenant cloud computing system, wherein such data is high-cardinality and multi-dimensional, where the data is initially captured on a per request basis such that there is an object of a first type for each request, objects of the first type store multi-dimensional data pertaining to usage of software and/or hardware for a specific request made by a specific tenant at a specific host at a specific time, the operations comprising:
within each host, combining the objects of the first type for each tenant by time windows to form objects of a second type, wherein the combining includes separately combining each like dimension of the multi-dimensional data, such that the objects of the second type store, for each dimension of the multi-dimensional data, data that represents the totality of requests made by each tenant in each time window at a specific host;
storing the objects of the second type in another system as separate text files as opposed to indexed records in a database; and
responsive to a query regarding usage of software and/or hardware regarding a specific one of the tenants during a specific interval that spans multiple consecutive time windows:
retrieving, from the files, objects of the second type that pertain to the specific tenant and the specific time interval,
combining the retrieved objects of the second type by time windows to generate a query result, wherein the combining includes separately combining each like dimension of the multi-dimensional data, such that the query result includes, for each dimension of the multi-dimensional data, data that represents the totality of requests made to the hosts by the specific tenant in each of the time windows in the specific time interval, and
returning the query result.

16. The apparatus of claim 15, wherein combining the objects of the first type and combining objects of second type includes aggregating one or more first dimensions by applying a first aggregation operation to respective first dimension values.

17. The apparatus of claim 16, wherein combining the objects of the first type and combining objects of second type includes aggregating one or more second dimensions by applying a second aggregation operation, different than the first aggregation operation, to respective second dimension values.

18. The apparatus of claim 15, wherein the objects of the first type and the objects of the second type are stored in structured object notation format.

19. The apparatus of claim 15, wherein the objects of the first type and the objects of the second type are stored in JavaScript Object Notation (JSON) format.

20. The apparatus of claim 15, wherein the operations further comprise:
causing the query result to be displayed on a graphical user interface of a client device.

* * * * *